United States Patent
Scheuer

(10) Patent No.: US 10,459,760 B2
(45) Date of Patent: Oct. 29, 2019

(54) OPTIMIZING JOB EXECUTION IN PARALLEL PROCESSING WITH IMPROVED JOB SCHEDULING USING JOB CURRENCY HINTS

(71) Applicant: SAP SE, Walldorf (DE)

(72) Inventor: Tobias Scheuer, Bruchsal (DE)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 15/206,186

(22) Filed: Jul. 8, 2016

(65) Prior Publication Data

US 2018/0011737 A1 Jan. 11, 2018

(51) Int. Cl.
G06F 9/48 (2006.01)

(52) U.S. Cl.
CPC .................. G06F 9/4881 (2013.01)

(58) Field of Classification Search
None
See application file for complete search history.

(56) References Cited

U.S. PATENT DOCUMENTS

| | | | | |
|---|---|---|---|---|
| 7,222,218 B2 * | 5/2007 | Dutt | ........ | G06F 8/451 710/244 |
| 7,346,902 B2 * | 3/2008 | Dutt | ........ | G06F 8/456 717/136 |
| 7,613,904 B2 * | 11/2009 | Jones | ........ | G06F 9/3851 712/214 |
| 8,205,200 B2 * | 6/2012 | Liao | ........ | G06F 9/4881 712/220 |
| 8,276,164 B2 * | 9/2012 | Munshi | ........ | G06F 9/4843 718/102 |
| 8,286,196 B2 * | 10/2012 | Munshi | ........ | G06F 8/41 718/100 |
| 8,813,085 B2 * | 8/2014 | Glew | ........ | G06F 9/4881 718/103 |
| 8,875,144 B2 * | 10/2014 | van Riel | ........ | G06F 9/4881 718/102 |
| 8,897,372 B2 * | 11/2014 | Nishihara | ........ | G06F 9/4881 375/240.24 |
| 9,170,843 B2 * | 10/2015 | Glew | ........ | G06F 9/5011 |
| 9,286,089 B2 * | 3/2016 | Pirvu | ........ | G06F 9/45516 |
| 9,471,373 B2 * | 10/2016 | Glew | ........ | G06F 9/5027 |
| 9,582,320 B2 * | 2/2017 | Holt | ........ | G06F 9/462 |
| 9,619,282 B2 * | 4/2017 | Davis | ........ | G06F 9/5044 |
| 9,773,344 B2 * | 9/2017 | Aelion | ........ | G06T 15/80 |
| 2007/0074217 A1 * | 3/2007 | Rakvic | ........ | G06F 9/3009 718/102 |
| 2007/0124732 A1 * | 5/2007 | Lia | ........ | G06F 9/485 718/102 |
| 2013/0179711 A1 * | 7/2013 | Aelion | ........ | G06F 1/324 713/322 |

* cited by examiner

*Primary Examiner* — Van H Nguyen

(74) *Attorney, Agent, or Firm* — Mintz, Levin, Cohn, Ferris, Glovsky and Popeo, P.C.

(57) ABSTRACT

Scheduling jobs from an application based on a job concurrency hint. The job concurrency hint providing an indication of the number and/or size of the jobs that can be handled by the job scheduler. The scheduling of the jobs based on the job concurrency hint including selecting the number and/or size of the jobs to pass to the job scheduler for execution by a thread in a core of a processor.

18 Claims, 7 Drawing Sheets

OPTIMIZING JOB EXECUTION IN PARALLEL PROCESSING WITH IMPROVED JOB SCHEDULING USING JOB CURRENCY HINTS

TECHNICAL FIELD

The subject matter described herein relates to optimizing job execution to increase the efficiency of parallel processing in a computing system.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Distributed database systems are used to provide resource planning functionality. The distributed database systems may include processors that are required to process multiple units of work, or jobs, in order to facilitate resource planning functionality for users of the distributed database systems.

SUMMARY

In one aspect, method is described that selects the number and/or size of jobs to be scheduled for execution based on a job concurrency hint giving an indication of the number and/or size of the jobs that can be executed in a thread by a core of a processor. The method comprises one or more operations, including obtaining, at an application from a job scheduler of at least one system comprising a programmable processor and prior to sending one or more application jobs to the job scheduler, a job concurrency hint. One or more application jobs can be selected, based on the job concurrency hint, for sending to the job scheduler. The selected jobs can be sent to the job scheduler for processing by the processor.

In some variations, the method may include one or more of the following operations and/or features. In some variations, the job concurrency hint can include an indication of the number of jobs and their job types currently in the job scheduler of the processor. The job types can include an indication of the length of the job in the job scheduler.

The selecting can be based on the job type of the application jobs. The execution of application source code can be monitored, prior to obtaining the job concurrency hint, to detect when the application source code identifies application jobs to send to the job scheduler. The selecting can include selecting application jobs to send to the scheduler to balance the load on the processor. The selecting can be based on historical data associated with a load on the processor. The historical data can include correlations between one or more previous job concurrency hints and a number and/or type of application jobs sent to the job scheduler by the application. The historical data can include load information for the processor.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DETAILED DESCRIPTION

A computer system can contain a job scheduler for scheduling jobs. The jobs can be processed by at least one processor of a computing system. Jobs are discrete units of work for a processor. Processors can be configured to process jobs in parallel. For example, one processor may be configured to process multiple jobs from the same application, different jobs from different applications, or the like. The goal of the processor is to efficiently process jobs for each of the applications that are demanding processing functionality of it. To avoid one application being penalized over another, the jobs from multiple applications can be processed in parallel, where one or more jobs from different applications can be processed intermittently.

Jobs may come in different types and different sizes, taking different lengths of time to complete. Each job takes a finite amount of time to schedule, set up, process, and return the results back to an application. Consequently, each job has an "overhead" associated with it. Consequently, when a job is a small job, or takes a short amount of time to process, the overhead costs associated with scheduling and/or initiating the job is high relative to the processing costs of processing the job. When a job is a large job, or takes a long amount of time to process, the overhead costs associated with scheduling and/or initiating the job is low relative to the processing costs of processing the job.

Applications that are running on or associated with the system generate application jobs that are sent to the job scheduler for scheduling. The applications are typically programmed so that they have no insight into the load on the at least one processor of the system. Therefore, applications running on the system or associated with the system may send application jobs for processing even when the job scheduler is under heavy load. The applications may send small jobs to the job scheduler which, due to the overhead costs associated with scheduling and/or initiating the jobs, may overly tax the at least one processor.

The presently described subject matter facilitates an application obtaining a job concurrency hint. The job concurrency hint can include an indication of the number and type of jobs that are currently scheduled for processing. When the jobs that are currently scheduled for processing are numerous and also small, therefore with a high level of accompanying initiation overhead costs, the application can be configured to limit the number of small application jobs it send to the job scheduler.

In this manner, the presently described subject matter can facilitate the reduction of costly initiation and/or scheduling overhead costs that accompany a large number of small jobs, this, in turn, increases the efficiency of the computing system.

Figure 1:
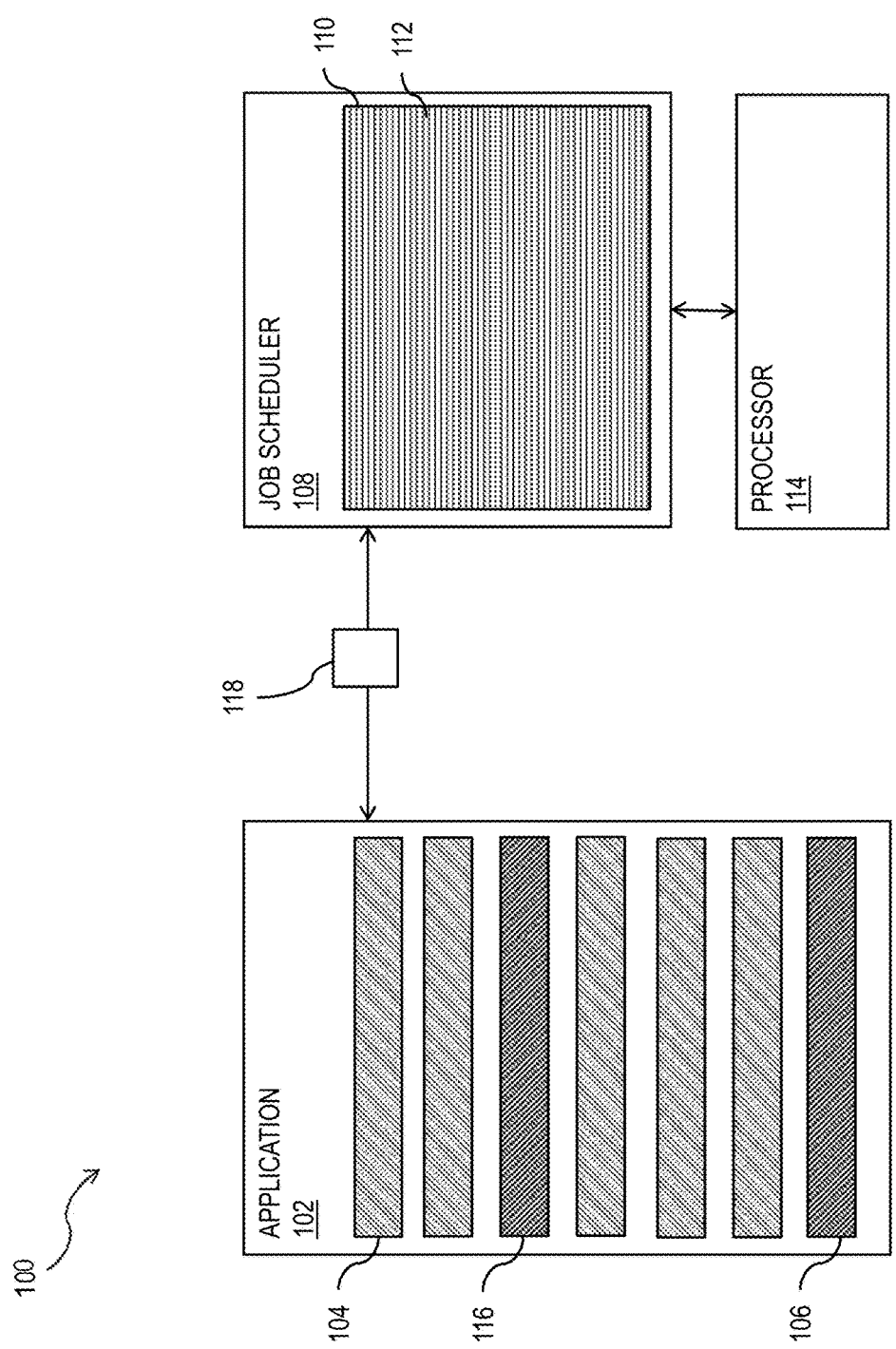
FIG. 1 illustrates a schematic representation of a system having one or more features consistent with the present description.
Figure 3:
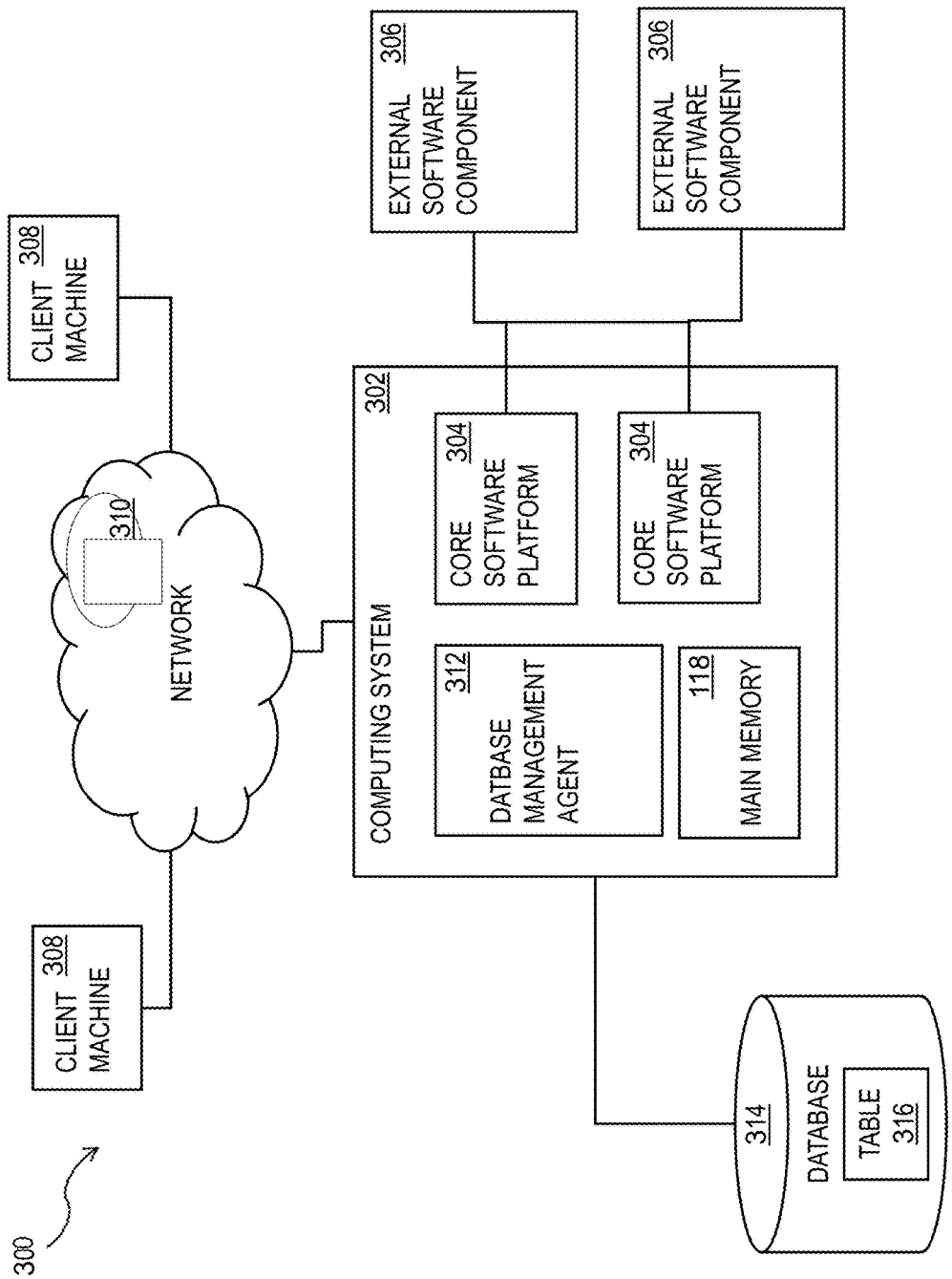
FIG. 3 shows a diagram of a system that can implement one or more features consistent with the presently described subject matter.

FIG. 1 illustrates a schematic representation of a system 100 having one or more features consistent with the present description. In one example, the system 100 may be a database system 300 as illustrated in FIG. 3. The system 100 may include an application 102 configured to cause the system 100 to perform one or more operations. The application 102 can include a plurality of application parts 104. As referred to herein, application parts may denote objects, object calls, one or more line of code, applications, subroutines, or the like. The application 102 may include an application part 106 that provides an instruction to send jobs to a job scheduler 108. A job scheduler is a computer application for controlling program execution of jobs. Other synonyms include batch system, distributed resource management system (DRMS), distributed resource manager (DRM), and, commonly today, workload automation. The data structure of jobs to run may be known as the job queue.

A thread can execute functions in the application 102. Functions can be nested, for example, within a first function, the application 102 can call into a second function and so on. At any point in time, the state of the execution of a thread, on a core of a processor, can be described as a list of nested functions and offsets within these functions.

A job scheduler can be configured to determine which job runs and on which thread. In some variations, the job scheduler can decide which core the job will run on.

A callstack 110 may include a stack of a plurality of functions 112. The job scheduler 108 can be configured to facilitate provision of the jobs 112 to the processor 114 for processing. A callstack 110 is a stack data structure that stores information about the active subroutines of a computer program. This kind of stack is also known as an execution stack, control stack, run-time stack, or machine stack, and is often shortened to just "the stack". A callstack 110 can be maintained for each job. The callstack 110 for a job can be generated when the job is created. The callstack 110 can be maintained for a current job graph when the job graph is executed. The job graph being a plurality of linked jobs ensuring that jobs are executed in order of priority. The callstack for a job can be generated based on a received concurrency hint. The concurrency hint can be received before the jobs, for performing in a thread of a core of a processor, are determined. That thread later executes the job graph. The generation of the callstack 110 is where manipulation of the number of jobs to be created and/or the size of the jobs can take place.

The application 102 may include an application part 116 that indicates the number and/or types of application jobs that the application 102 intends to send to the job scheduler 108. The callstacks of the jobs that are created can be collected. Determination of where the job graphs are executed can be made. With this information the source code location can be found where a call to the concurrency hint object (or function call) is to be inserted. The call to the concurrency hint object (or function call) can be configured to hook in and provide the application 102 with a hint for the number of jobs that are to be created to maintain a threshold level of efficiency. In some variations, the concurrency hint is a callback into the job executor, allowing the job executor can to influence the job creation.

The application parts 104 can be analyzed to determine when the application 102 determines the number and/or types of application jobs that are to be sent to the job scheduler 108. While illustrated as being discrete in FIG. 1, the application parts 104 can be sequential parts, parallel parts, combined into one part, split between multiple other parts, or the like. In some variations, the system 100 can be configured to detect application part 116 of the application 102 has been reached. In other variations, the application 102 can be modified at application part 116. In some variations, applications can be configured to call a concurrency hint object. The concurrency hint object can be an object stored on the system and configured to obtain a concurrency hint from the job scheduler 108. The concurrency hint object can be further configured to determine the number and/or types of jobs that need to be provided to the job scheduler 108 to reduce the overhead associated initiation and setup of jobs.

The job concurrency hint 118 can include an indication of the number and/or types of jobs 112 scheduled in a call stack 110 associated with the job scheduler 108.

The types of jobs can include long-processing time jobs, short-processing time jobs, or the like. At application part 116 of the application the application jobs that the application 102 will send to the job scheduler 108 can be determined. The application 102 can be configured to determine the number and/or type of application jobs to send to the job scheduler 108 based on the number and/or types of scheduled jobs revealed by the job concurrency hint 118, the number and/or types of the application jobs that the application 102 intends to send to the job scheduler 108, and/or historical job concurrency hints previously received at the application 102.

For example, when the job concurrency hint 118 indicates that there are a large number of short-processing time jobs scheduled for processing in the call stack 110, the application can be configured to refrain from sending small application jobs to the job scheduler 108. The application can be configured to pause the sending of application jobs to the job scheduler 108 until the load on the processor 114 has reduced, reconfigure the application jobs the application 102 intends to send to the scheduler into larger jobs, or the like.

In some variations, the concurrency hint can be a function call, where the application 102 calls into the job scheduler 108 to get a hint about the number of jobs it should create. This way the job scheduler 108 can not only track the callstack of that function call and where it comes from, the job scheduler 108 can also relate this callstack to the callstack of the job graph execution and from there to the callstacks of the individual jobs that constitute the job graph. This facilitates the job scheduler 108 to relate an actual call to the history that the job scheduler 108 kept for this callstack associated with the the concurrency hint function, and use the history to modify the value of the concurrency hint that the job scheduler returns to the application 102.

Figure 2:
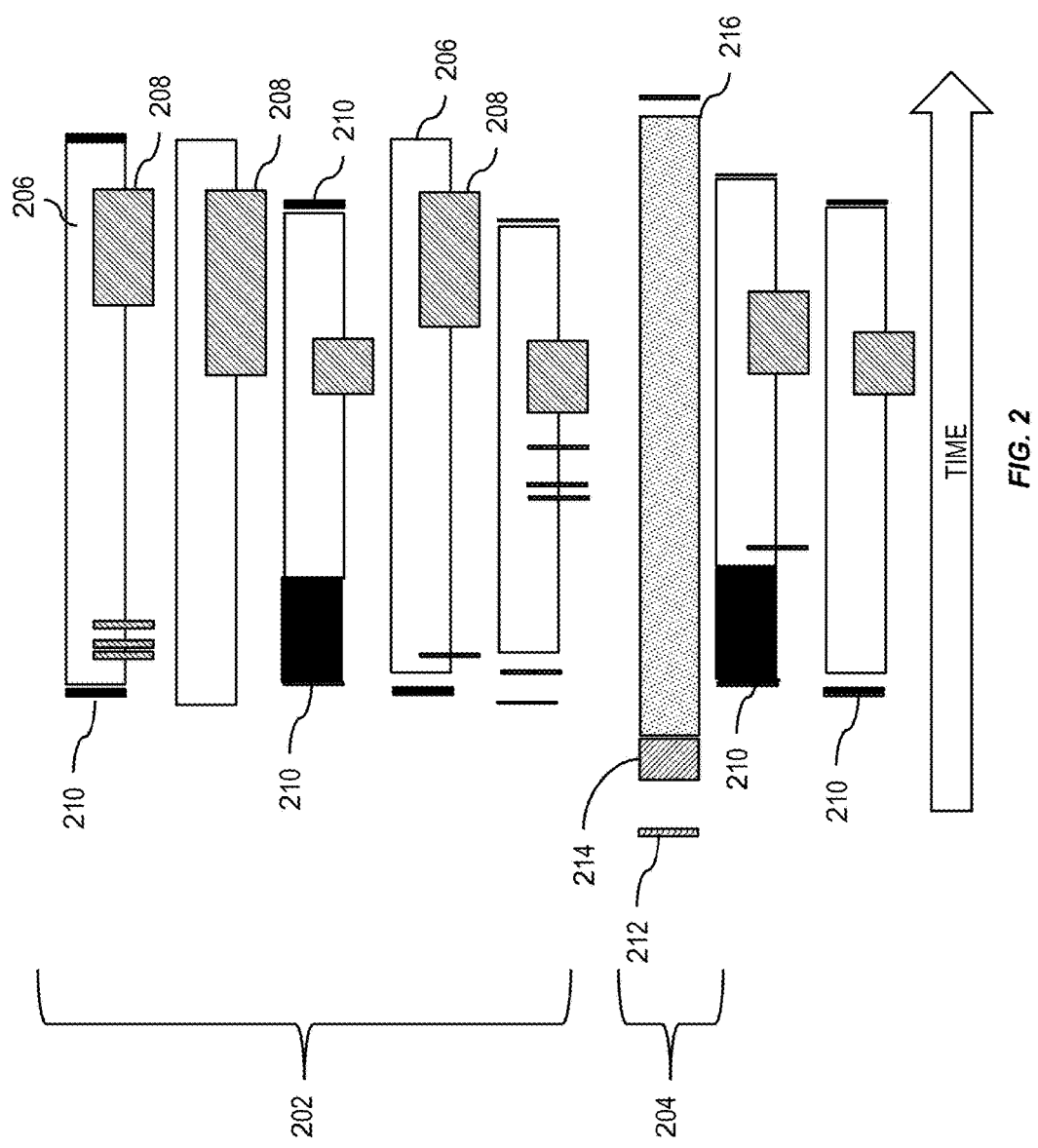
FIG. 2 illustrates the processing of jobs over time, the jobs provided by an application to a job scheduler.

FIG. 2 illustrates the time taken to process jobs provided by an application to a job scheduler, such as job scheduler 108 illustrated in FIG. 1. In FIG. 2, time goes from left to right, and each row refers to a different thread.

The processing illustrated at 202 includes processing of jobs sent, by an application, to a job scheduler where the application did not receive a concurrency hint. The processing illustrated at 204 includes processing of jobs set, by an application, to a job schedule where the application did receive a concurrency hint and the application modified the set of jobs set to the job scheduler accordingly.

Referring to the processing of the jobs at 202, at 206 there is a job run by at least one processor of a system, such as processor 114 illustrated in FIG. 1. At 208, there is a lock in the job run 206. When a lock occurs the processing of the jobs serialize, thereby causing fewer jobs to be processed. This causes reduced efficiency in the processing of the job run. At 210, the jobs have to be initiated. The block at 210 designates the overhead necessary to initiate the jobs in the job run.

Referring to the processing of the jobs at 204, a concurrency hint 212 is generated and sent to the application, such as application 102, illustrated in FIG. 1. At 214, the job scheduler has received the jobs from the application 102, the number and/or type of jobs provided by the application based on the concurrency hint. The jobs are then processed at 216 and the application merely waits for the results. The instances of locks in the job run are much less after provision of the current hint 212 to the application. Furthermore, there is a greatly reduced required overhead 210 for processing the job run.

At 204, the spectrum relates to the first thread. The first thread is the thread that creates jobs and executes them on a core of a processor. The first thread calls the concurrency hint function 212, then creates the jobs 214 and sends them to the job scheduler to be executed. The jobs are then processed at 216. The thread waits for all the jobs to finish. During that time, the job scheduler runs the jobs on worker threads. The worker threads includes overhead 210 prior to the job being run. The job is run at 206. During the run, the job can enter various wait states 208, for example waiting for mutex locks, or any other synchronization mechanism, or the run can wait for things like network IO, or the like.

The number and/or type of application jobs that are provided to the job scheduler, such as job scheduler 108 in FIG. 1, can be based on a statistical prediction. The statistical prediction for determining a preferred concurrency hint value can be based on measured job graph executions in previous runs that relate the callstack of the call to the concurrency hint callback. These statistical predictions can be determined after initial jobs have run. After the jobs have all run (i.e., after 206 in FIG. 2), the job scheduler can be configured to measure the elapsed times of the job runs, the total waiting times 208, the overhead times 210, and the like. With several samples that all relate to the same call associated with a single concurrency hint, such as concurrency hint 212, the job scheduler can infer if the jobs are too small compared to the overhead and waiting times involved. For example, if the jobs are found to be too small, then the next time the concurrency hint callback is called, the job scheduler can return a smaller value, which will lead to fewer and hence longer jobs being created.

The efficiencies brought about by the presently described subject matter are compounded in distributed computing systems, such as an enterprise resource management system or enterprise database system. FIG. 3 shows a diagram of such a system 300 that can implement one or more features of the current subject matter. A computing system 302 can include one or more core software platform modules 304 providing one or more features of a business software system or other software that includes database management features. The computing system can also aggregate or otherwise provide a gateway via which users can access functionality provided by one or more external software components 306. One or more client machines 308 can access the computing system, either via a direct connection, a local terminal, or over a network 310 (e.g. a local area network, a wide area network, a wireless network, the Internet, or the like).

A database management agent 312 or other comparable functionality can access a database 314 that includes at least one table 316, which can in turn include at least one column. The database management agent 312 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 312 or other comparable functionality can be configured to load a database table 316, or other comparable data set, into the main memory 318. The database management agent 312 can be configured to load the information from the database 314 to the main memory 318 in response to receipt of a query instantiated by a user or computer system through one or more client machines 308, external software components 306, core software platforms 304, or the like.

In some variations, applications running on client machines 308 can cause one or more operations to be performed by the computing system 302. The applications running on client machines 308 can, therefore, cause the computing system 302 to require scheduling of jobs to be processed by at least one processor of the computing system 302. The computing system 302 can be configured to perform one or more of the operations of system 100 of FIG. 1.

Figure 4:
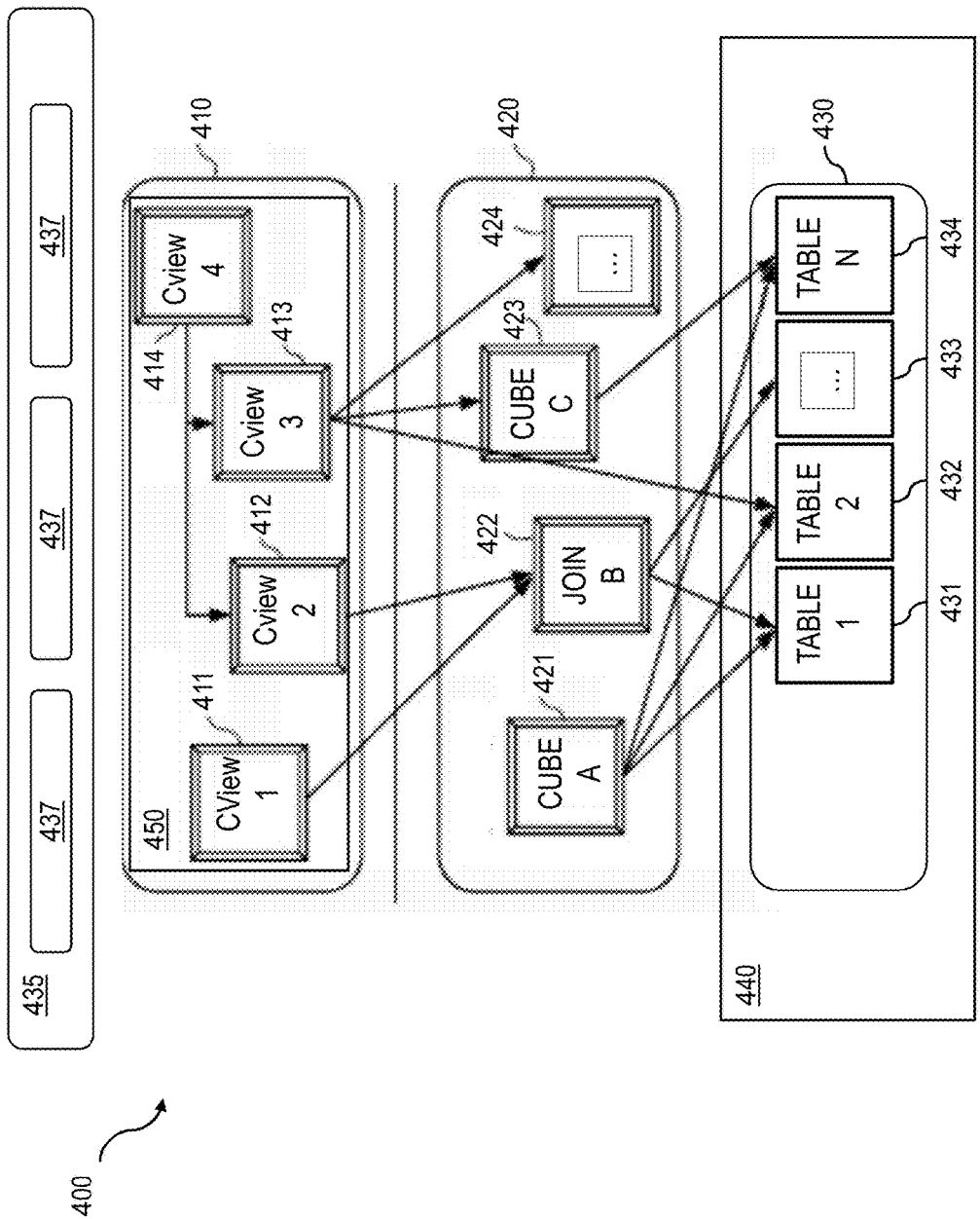
FIG. 4 is a diagram that illustrates a computing architecture having one or more features consistent with the presently described subject matter.
Figure 5:
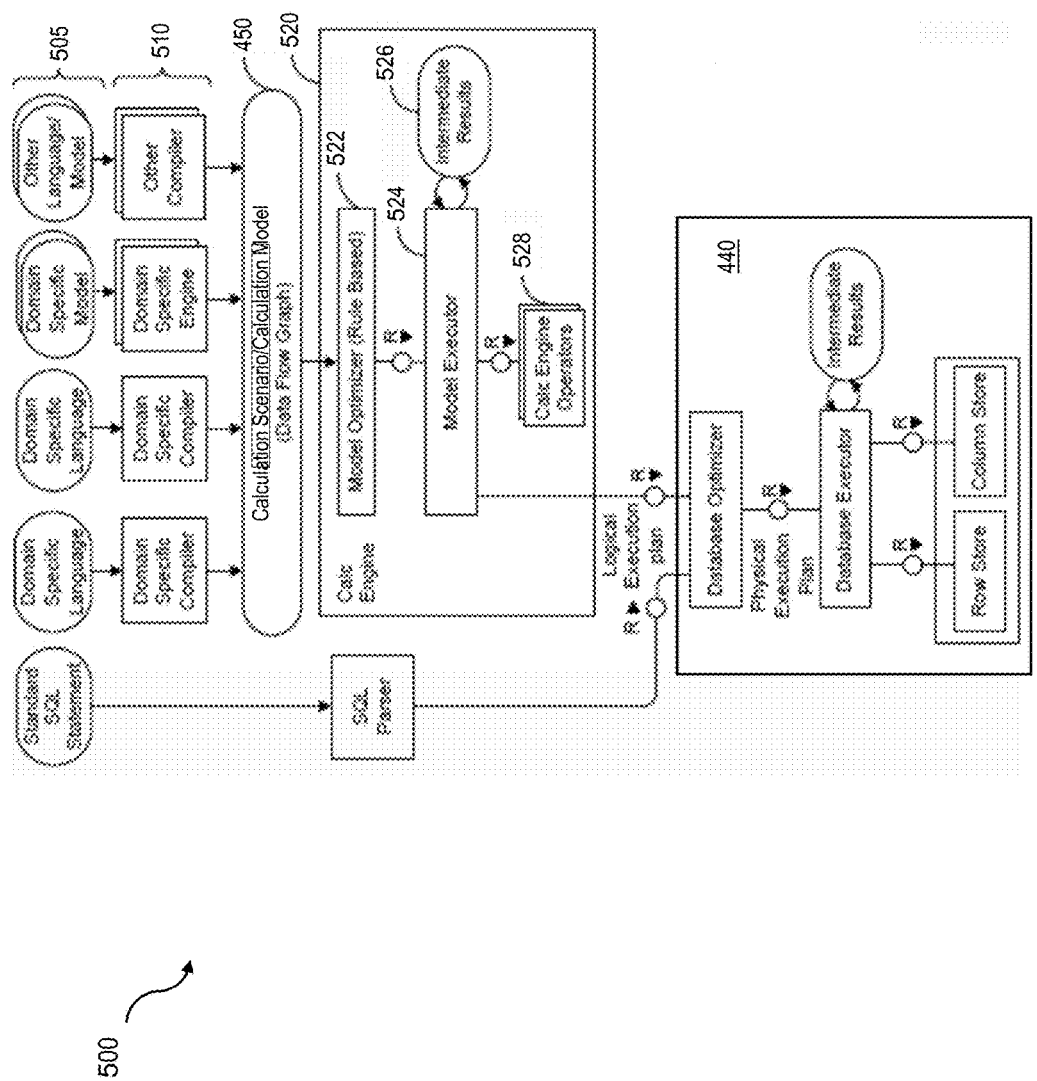
FIG. 5 is a diagram illustrating a sample architecture for request processing and execution control, the sample architecture having one or more features consistent with the presently described subject matter.

FIG. 4 is a diagram that illustrates a computing architecture 400 including a database system that includes three layers: a top layer, calculation engine layer 410, an intermediate layer, or logical layer 420, and a top layer, or physical table-pool 430. One or more application servers 435 implementing database client applications 437 can access the database system 500, as shown in FIG. 5. Calculation scenarios can be executed by a calculation engine, which can form part of a database or which can be part of the calculation engine layer 410 (which is associated with the database). The processes performed at the calculation engine layer 410 can be executed in one or more jobs being scheduled by a job scheduler, such as job scheduler 108. A job concurrency hint can be provided to the calculation engine layer 410. The calculation engine layer 410 can be configured to determine the number of jobs and/or type of jobs to send to the job scheduler.

The calculation engine layer 410 can be based on and/or interact with the other two layers, the logical layer 420 and the physical table pool 430. In some variations, the physical table pool 430 can comprise database operations configured to access and perform the database operations on the individual tables. In some variations, the basis of the physical table pool 430 consists of physical tables (called indexes) containing the data, which can be stored on one more database servers 740. Various tables 431-434 can be joined using logical metamodels 421-424 defined by the logical layer 420 to form an index. For example, the tables 431-434 in a cube (e.g. an online analytical processing or "OLAP" index) can be assigned roles (e.g., fact or dimension tables) and joined to form a star schema. It is also possible to form join indexes (e.g. join index B 422 in FIG. 4), which can act like database views in computing environments such as the Fast Search Infrastructure (FSI) available from SAP SE of Walldorf, Germany.

A calculation scenario 450 can include individual nodes (e.g. calculation nodes) 411-414, which in turn can each define operations such as joining various physical or logical indexes and other calculation nodes (e.g., CView 4 is a join of CView 2 and CView 3). That is, the input for a node 411-414 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 450, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 450 can be created which can be reused by multiple queries even if such queries do not require every attribute specified by the calculation scenario 450. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 450 can be uniquely identifiable by a name (e.g., the calculation scenario 450 can be a database object with a unique identifier, etc.). Accordingly, the calculation scenario 450 can be queried in a manner similar to a view in a SQL database. Thus, the query is forwarded to the calculation node 411-414 for the calculation scenario 450 that is marked as the corresponding default node. In addition, a query can be executed on a particular calculation node 411-414 (as specified in the query). Furthermore, nested calculation scenarios can be generated in which one calculation scenario 450 is used as source in another calculation scenario (e.g. via a calculation node 411-414 in this calculation scenario 450). Each calculation node 411-414 can have one or more output tables. One output table can be consumed by several calculation nodes 411-414.

FIG. 5 is a diagram 500 illustrating a sample architecture for request processing and execution control. As shown in FIG. 5, artifacts 500 in different domain specific languages 505 can be translated by their specific compilers 510 into a common representation called a "calculation scenario" 450 (which is also referred to in in FIG. 5 as a calculation model). To achieve enhanced performance, the models and programs written in these languages are executed inside the database server 740. This arrangement eliminates the need to transfer large amounts of data between the database server 740 and a client application 437, which can be executed by an application server 435. Once the different artifacts 500 are compiled into this calculation scenario 515, they can be processed and executed in the same manner. A calculation engine 520 executes the calculation scenarios 515.

A calculation scenario 515 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "CREATE CALCULATION SCENARIO<NAME> USING<XML or JSON>". Once a calculation scenario 515 is created, it can be queried (e.g., "SELECT A, B, C FROM<scenario name>", etc.). In some cases, databases can have pre-defined calculation scenarios 515 (default, previously defined by users, etc.). Calculation scenarios 515 can be persisted in a repository (coupled to the database server 740) or in transient scenarios. Calculation scenarios 515 can also be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

Figure 6:
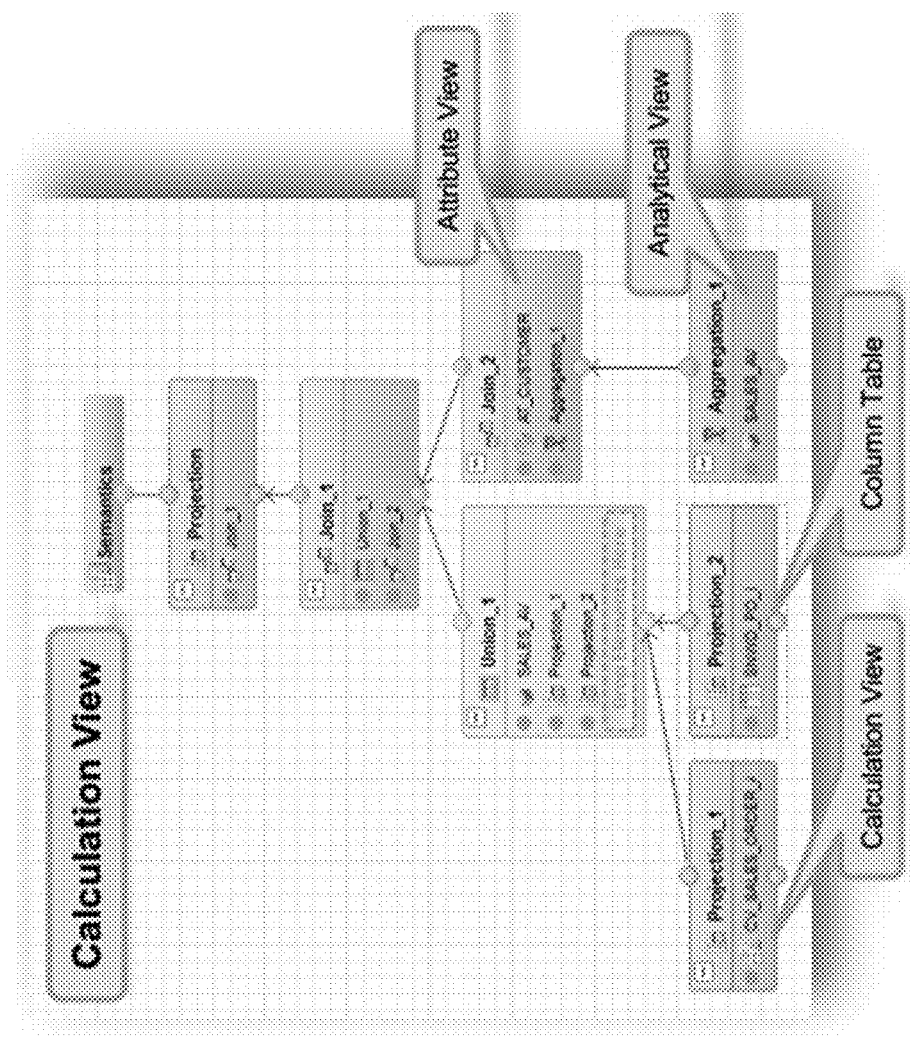
FIG. 6 is an illustration of an exemplary graphical calculation view having one or more features consistent with the presently described subject matter; and, FIG. 7 is a process flow diagram illustrating a method having one or more features consistent with the presently described subject matter.

FIG. 6 is an illustration of an exemplary graphical calculation view 600 having one or more features consistent with the current subject matter. The graphical calculation view 600 is an example of a calculation view that can be presented to a user of the database management system. The calculation view can also be presented to a user in a scripted fashion. For example, an SQL script representing the calculation view can be presented to the user.

The model optimizer 522 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 522 can additionally or alternatively be based on an estimated and/or actual amount of memory consumed by the dataset, a number of rows and/or columns in the dataset, and the number of cell values for the dataset, and the like.

A calculation scenario 515 as described herein can include a type of node referred to herein as a semantic node (or sometimes semantic root node). A database modeler can flag the root node (output) in a graphical calculation view to which the queries of the database applications directed as semantic node. This arrangement allows the calculation engine 520 to easily identify those queries and to thereby provide a proper handling of the query in all cases.

To process queries submitted through the calculation engine layer 410 using a calculation scenarios 450, the physical layer 430 may be required to load one or more tables 431-434 into the main memory 318 of the computing system 302. There may be occasion where there is insufficient capacity to load one of the tables, in its entirety, into the memory. Not having the whole table in the main memory 318 can create a situation here the computing system 302 has to continually communicate with disk memory on which a copy of the table may be stored. This increases the processing time of the executed calculation scenario 450.

Similarly, the calculation nodes 411-414 may include one or more constraints that narrow the part of the table that needs to be processed. The constraints may result in a subset of the rows of a table that require processing. Consequently, there would be no need to load every row of the table into the main memory 318 of the computing system 302.

Figure 7:
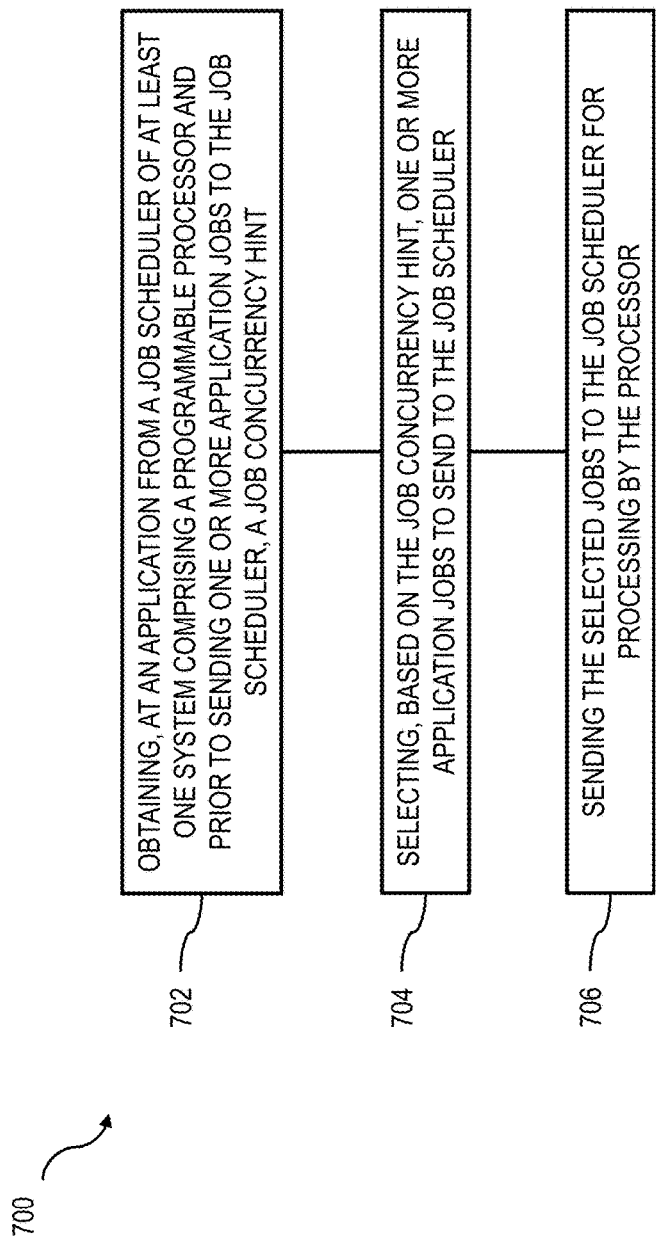

FIG. 7 is a process flow diagram 700 illustrating a method having one or more features consistent with the presently described subject matter.

At 702, a job concurrency hint can be obtained. The job concurrency hint can be obtained at an application from a job scheduler of at least one system comprising a programmable processor. The job concurrency hint can be obtained prior to sending one or more application jobs to the job scheduler. The job concurrency hint can include an indication of the number of jobs and their job types currently in the job scheduler of the processor. The job types can include an indication of the length of the job in the job scheduler.

In some variations, the execution of application source code can be monitored to detect when the application source code identifies application jobs to send to the job scheduler. The execution of the application source code can be monitored prior to the obtaining of the job concurrency hint.

At 704, one or more application jobs can be selected to send to the job scheduler. The selecting can be based on the job concurrency hint. The selecting can be based on the job type of the application jobs. The selecting can include selecting application jobs to send to the scheduler to balance the load on the processor. The selecting can be further based on historical data associated with a load on the processor. The historical data can include correlations between one or more previous job concurrency hints and a number and/or type of application jobs sent to the job scheduler by the application. The historical data can include load information for the processor.

At 706, the selected jobs can be send to the job scheduler for processing by the processor. For example, as illustrated in FIG. 1.

Without in any way limiting the scope, interpretation, or application of the claims appearing herein, a technical effect of one or more of the example embodiments disclosed herein may include reducing the processing overhead involved with initiating individual jobs by a job scheduler and thereby increasing the efficiency of the computing system having at least one processor.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
obtaining, at an application from a job scheduler of at least one system comprising a programmable processor and prior to sending one or more application jobs to the job scheduler, a job concurrency hint, the job concurrency hint comprising a statistical prediction based on a plurality of job graphs, each of the plurality of job graphs corresponding to a previously processed application job, each of the plurality of job graphs comprising at least one of an elapsed time, a waiting time, and an overhead time for the corresponding previously processed application job, the job concurrency hint adjusted to increase elapsed time as compared to waiting and overhead times, the adjusted job concurrency hint corresponding to a number and a type of application jobs corresponding to fewer and longer application jobs;
selecting, based on the job concurrency hint, one or more application jobs to send to the job scheduler; and, sending the selected application jobs to the job scheduler for processing by the processor.

2. The method of claim 1, wherein the job concurrency hint includes an indication of the number of application jobs and their job types currently in the job scheduler of the processor.

3. The method of claim 2, wherein the job types include an indication of the length of the application job in the job scheduler.

4. The method of claim 1, wherein the selecting is based on the job type of the application jobs.

5. The method of claim 1, further comprising:
monitoring, prior to obtaining the job concurrency hint, the execution of application source code to detect when the application source code identifies application jobs to send to the job scheduler.

6. The method of claim 1, wherein the selecting includes at least:
selecting application jobs to send to the scheduler to balance the load on the processor.

7. The method of claim 1, wherein the selecting is further based on historical data associated with a load on the processor.

8. The method of claim 7, wherein the historical data includes correlations between one or more previous job concurrency hints and a number and/or type of application jobs sent to the job scheduler by the application.

9. The method of claim 7, wherein the historical data includes load information for the processor.

10. A system comprising:
a processor; and,
a memory configured to store computer executable instructions, which, when executed by the processor, cause the processor to perform operations, the operations comprising:
obtaining, at an application from a job scheduler of at least one system comprising a programmable processor and prior to sending one or more application jobs to the job scheduler, a job concurrency hint, the job concurrency hint comprising a statistical prediction based on a plurality of job graphs, each of the plurality of job graphs corresponding to a previously processed application job, each of the plurality of job graphs comprising at least one of an elapsed time, a waiting time, and an overhead time for the corresponding previously processed application job, the job concurrency hint adjusted to increase elapsed time as compared to waiting and overhead times, the adjusted job concurrency hint corresponding to a number and a type of application jobs corresponding to fewer and longer application jobs;
selecting, based on the job concurrency hint, one or more application jobs to send to the job scheduler; and,
sending the selected application jobs to the job scheduler for processing by the processor.

11. The system of claim 10, wherein the job concurrency hint includes an indication of the number of application jobs and their job types currently in the job scheduler of the processor.

12. The system of claim 11, wherein the job types include an indication of the length of the application job in the job scheduler.

13. The system of claim 10, wherein the selecting is based on the job type of the application jobs.

14. The system of claim 10, wherein the operations further comprise, at least:
monitoring, prior to obtaining the job concurrency hint, the execution of application source code to detect when the application source code identifies application jobs to send to the job scheduler.

15. The system of claim 10, wherein the selecting includes at least:
selecting application jobs to send to the scheduler to balance the load on the processor.

16. The system of claim 10, wherein the selecting is further based on historical data associated with a load on the processor.

17. The system of claim 16, wherein the historical data includes correlations between one or more previous job concurrency hints and a number and/or type of application jobs sent to the job scheduler by the application.

18. The system of claim 16, wherein the historical data includes load information for the processor.

* * * * *